(12) United States Patent
Strobel et al.

(10) Patent No.: US 9,291,194 B2
(45) Date of Patent: Mar. 22, 2016

(54) SPINDLE DRIVE FOR AN ADJUSTMENT ELEMENT OF A MOTOR VEHICLE

(71) Applicant: Brose Fahrzeugteile GmbH & Co. KG, Hallstadt, Hallstadt (DE)

(72) Inventors: Ulrich Strobel, Weitramsdorf (DE); Daniela Kosmala, Hallstadt (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/368,203

(22) PCT Filed: Dec. 11, 2012

(86) PCT No.: PCT/EP2012/005106
§ 371 (c)(1),
(2) Date: Jun. 23, 2014

(87) PCT Pub. No.: WO2013/091792
PCT Pub. Date: Jun. 27, 2013

(65) Prior Publication Data
US 2014/0376991 A1 Dec. 25, 2014

(30) Foreign Application Priority Data
Dec. 23, 2011 (DE) .................... 20 2011 109 569 U

(51) Int. Cl.
*F16C 11/06* (2006.01)
*E05F 15/622* (2015.01)

(52) U.S. Cl.
CPC ............... *F16C 11/06* (2013.01); *E05F 15/622* (2015.01); *F16C 11/0633* (2013.01);
(Continued)

(58) Field of Classification Search
CPC .... B60G 7/005; B60G 2204/416; B62D 7/16; B62D 7/166; F16C 11/0623; F16C 11/0628; F16C 11/0633; F16C 11/0638

USPC .................. 403/90, 122, 133–135, 141–143; 296/56, 146.4
See application file for complete search history.

(56) References Cited

U.S. PATENT DOCUMENTS

| 3,108,830 A | 10/1963 | Fierstine et al. |
| 3,862,807 A | 1/1975 | Doden et al. |

(Continued)

FOREIGN PATENT DOCUMENTS

| DE | 2235874 | 2/1974 |
| DE | 10361101 | 4/2005 |

(Continued)

OTHER PUBLICATIONS

"International Search Report and Written Opinion," for PCT/EP2012/005106 related to U.S. Appl. No. 14/368,203, mailed Mar. 22, 2013 (10 pages).

(Continued)

*Primary Examiner* — Josh Skroupa
(74) *Attorney, Agent, or Firm* — Pauly, Devries Smith & Deffner, LLC

(57) ABSTRACT

A spindle drive for an adjusting element of a motor vehicle includes a drive motor with a spindle-spindle nut gear arranged downstream for producing a drive force along a geometric spindle axis. Two connectors are provided for transferring the drive force and at least one connector includes a ball joint with a ball socket and an assigned ball. The ball socket includes a ball socket housing with a connecting piece. It is proposed that the ball socket in the ball socket housing has a damping shell and a bearing shell in the damping shell for the positive engagement with the ball so that the flux of force for the drive force passes via the damping shell and the bearing shell.

16 Claims, 5 Drawing Sheets

(52) U.S. Cl.
CPC ...... *F16C 11/0638* (2013.01); *E05Y 2201/636* (2013.01); *E05Y 2600/502* (2013.01); *E05Y 2600/524* (2013.01); *E05Y 2600/60* (2013.01); *E05Y 2800/122* (2013.01); *E05Y 2800/232* (2013.01); *E05Y 2800/422* (2013.01); *E05Y 2900/531* (2013.01); *E05Y 2900/536* (2013.01); *E05Y 2900/546* (2013.01); *Y10T 403/32631* (2015.01); *Y10T 403/32721* (2015.01); *Y10T 403/32803* (2015.01)

(56) References Cited

U.S. PATENT DOCUMENTS

| | | | | |
|---|---|---|---|---|
| 4,367,968 | A * | 1/1983 | Ishida | 403/122 |
| 4,902,157 | A * | 2/1990 | Ishikawa et al. | 403/134 |
| 4,993,863 | A * | 2/1991 | Inoue | 403/133 |
| 5,672,024 | A * | 9/1997 | Maughan et al. | 403/141 |
| 5,697,723 | A * | 12/1997 | Wood | 403/135 |
| 6,254,114 | B1 * | 7/2001 | Pulling et al. | 403/135 |
| 6,302,615 | B1 * | 10/2001 | Kleiner et al. | 403/135 |
| 7,044,018 | B2 * | 5/2006 | Sanchez et al. | 403/135 |
| 7,172,237 | B2 * | 2/2007 | Bauman et al. | 403/122 |
| 7,686,530 | B2 * | 3/2010 | Schilz et al. | 403/122 |
| 8,770,884 | B2 * | 7/2014 | Erdogan et al. | 403/135 |
| 8,864,155 | B2 * | 10/2014 | Kuroda | 403/122 |
| 8,979,376 | B2 | 3/2015 | Angenheister | |
| 2007/0212164 | A1 * | 9/2007 | Bosse et al. | 403/132 |

FOREIGN PATENT DOCUMENTS

| | | |
|---|---|---|
| DE | 202008001325 | 5/2008 |
| DE | 202008006915 | 9/2008 |
| DE | 102008062391 | 6/2010 |
| DE | 102009004517 | 7/2010 |
| DE | 202010009334 | 9/2011 |
| DE | 202011109569 | 3/2012 |
| WO | WO 2005066510 A1 * | 7/2005 |
| WO | WO 2010112006 A1 * | 10/2010 |
| WO | 2013091792 | 6/2013 |

OTHER PUBLICATIONS

"Search Report," for German Patent Application No. 202011109569.3 related to U.S. Appl. No. 14/368,203, mailed Jul. 13, 2012 (4 pages).

* cited by examiner a)

b)

SPINDLE DRIVE FOR AN ADJUSTMENT ELEMENT OF A MOTOR VEHICLE

CROSS-REFERENCE TO RELATED APPLICATIONS

This application is a national stage application under 35 U.S.C. 371 of Inter-national Patent Application Ser. No. PCT/EP2012/005106, entitled "Spindelantrieb für ein Verstellelement eines Kraftfahrzeugs," filed Dec. 11, 2012, which claims priority from German Patent Application No. DE 20 2011 109 569.3, filed Dec. 23, 2011, the disclosures of which are incorporated herein by reference.

FIELD OF THE INVENTION

The invention relates to a spindle drive for an adjusting element of a motor vehicle comprising a ball as well as the ball socket of such a ball.

BACKGROUND

The term "adjusting element" in the present case is to be understood in broad terms. It encompasses, for example, a tailgate, a trunk lid, an engine hood, a side door, a luggage compartment flap, a lifting roof or the like, of a motor vehicle. The field of application of the motorized adjustment of a tailgate of a motor vehicle is given precedence hereinafter. This is not to be understood as limiting.

During the motorized actuation of tailgates, or the like, the use of spindle drives is becoming increasingly important. The known spindle drive (DE 10 2008 062 391 A1), on which the invention is based, is provided with a drive motor with a spindle-spindle nut gear arranged downstream for producing a drive force along a geometric spindle axis. For transferring the drive force two connectors are provided on the end face, said connectors in each case forming a ball joint with a ball socket and assigned ball.

The ball sockets of the two connectors of the known spindle drive are provided in the conventional manner with a ball socket housing for receiving the ball, said ball socket housing being integrally configured with a connecting piece for fastening to the spindle housing.

Due to the fact that the drive motor with the drive train arranged downstream produces vibrations during the motorized adjustment, it is desirable that the spindle drive is vibrationally decoupled as far as possible from the tailgate and/or the body of the motor vehicle. This is required here for optimizing the known spindle drive.

A known attachment for vibrational decoupling is to provide the ball joint of a mechanical connector with a damping material such that a resilient coupling with vibration damping (DE 22 35 874 A1) is produced between the ball socket housing and the ball. A drawback with the known arrangement, however, is the fact that the improvement in the damping properties of the ball joint is always associated with an impairment of the sliding behavior and thus an increase in the wear.

SUMMARY

The object of the invention is to design and develop the known spindle drive such that the vibrational decoupling from the adjusting element and/or the body of the motor vehicle is improved without impairing the wear behavior.

Essentially the principal consideration is to implement the functions of "bearing of the ball" and "vibrational decoupling" in separate components. In particular, it is proposed that the ball socket in the ball socket housing has a damping shell and a bearing shell in the damping shell for positive engagement with the ball. In this case, the arrangement is such that the flux of force for the drive force passes via the damping shell and the bearing shell. In this case, the damping shell ensures the vibrational decoupling and the bearing shell ensures the correct bearing of the assigned ball.

By means of the proposed solution, an optimal design of the ball socket with regard to the desired vibrational decoupling, on the one hand, and with regard to the bearing of the ball, on the other hand, is possible without the respective other function being affected.

In an embodiment, the material of the bearing shell has a greater hardness and/or a lower frictional value than the material of the damping shell. This primarily takes into account the objective of good sliding properties.

In an embodiment, the bearing shell consists of a hard elastic plastics material and, alternatively or additionally, the damping shell consists of a highly flexible plastics material.

In some embodiments, the bearing shell is assigned at least one retaining element for retaining the ball in the bearing shell.

In an embodiment, a locking arrangement is provided for locking the retaining element in its retaining position. In this case, in an alternative the locking arrangement is additionally assigned the function of fixing the damping shell and the bearing shell in the ball socket housing, which leads to a particularly compact arrangement.

In an embodiment, a ball socket for a ball joint of a proposed spindle drive is described herein.

It is essential according to further teaching that a damping shell is provided in the ball socket housing and a bearing shell for the positive engagement with the ball is provided in the damping shell, so that the flux of force for the drive force passes via the damping shell and the bearing shell. In this regard, reference is made entirely to the embodiments of the proposed spindle drive.

In an embodiment, the invention provides a spindle drive for an adjusting element of a motor vehicle comprising a drive motor with a spindle- spindle nut gear arranged downstream for producing a drive force along a geometric spindle axis, wherein two connectors are provided for transferring the drive force and wherein at least one connector comprises a ball joint with a ball socket and an assigned ball, wherein the ball socket comprises a ball socket housing with a connecting piece, wherein the ball socket in the ball socket housing has a damping shell and a bearing shell in the damping shell for the positive engagement with the ball so that the flux of force for the drive force passes via the damping shell and the bearing shell.

In an embodiment, the material of the bearing shell has a greater hardness and/or a lower frictional value than the material of the damping shell.

In an embodiment, the bearing shell consists of a hard elastic material, in particular plastics material, and/or the damping shell consists of a highly flexible material, in particular plastics or rubber.

In an embodiment, the damping shell is inserted into the ball socket housing or is injection-molded in a plastics injection-molding process, and/or the bearing shell is inserted into the damping shell or injection-molded in the plastics injection-molding process.

In an embodiment, the bearing shell is assigned at least one retaining element for retaining the ball in the bearing shell, such as a plurality of, in particular four, retaining elements are provided, said retaining elements being arranged, in particular, uniformly distributed over the periphery of the ball.

In an embodiment, the at least one retaining element is able to be deflected out of a retaining position such that the ball is able to be inserted into the bearing shell by deflecting the at least one retaining element, such that the at least one retaining element is of hinge-like design, further the at least one retaining element can have a hinge pin mounted in the bearing shell, or in that the at least one retaining element is configured as a film hinge which is formed integrally from the bearing shell.

In an embodiment, the at least one retaining element is designed and arranged such that a deflection of the retaining element is associated with an, in particular, resilient deformation of the damping shell, such that the at least one retaining element engages in a hook-like manner in the damping shell and, as result, secures the bearing shell together with the ball against being pulled out.

In an embodiment, a locking arrangement is provided for locking the at least one retaining element in its retaining position, such that by means of the locking arrangement the damping shell and/or the bearing shell may be fixed in the ball socket housing.

In an embodiment, the locking arrangement has a clamp arrangement which is able to be inserted into the ball socket, in particular into the ball socket housing, which blocks a deflection of the retaining element out of its retaining position.

In an embodiment, the clamp arrangement is engaged with the damping shell and blocks the deflection of the at least one retaining element via the damping shell, such that the clamp arrangement retains the damping shell in the ball socket housing.

In an embodiment, the ball socket housing comprises a receiver, in particular at least one opening for inserting the clamp arrangement and as a result provides a counter bearing for the clamp arrangement.

In an embodiment, the clamp arrangement is designed as a wire clamp, such that the wire clamp is of substantially U-shaped design and with both of its free ends is able to be inserted into corresponding openings of the ball socket housing.

In an embodiment, the adjusting element is a tailgate, a trunk lid, an engine hood, a side door, a luggage compartment flap, a lifting roof or the like, of a motor vehicle.

In an embodiment the invention provides a ball socket for a ball joint for transferring drive force, wherein a ball socket housing is provided with a connecting piece, wherein a damping shell is provided in the ball socket housing and a bearing shell for the positive engagement with the assigned ball is provided in the damping shell, so that the flux of force for the drive force passes via the damping shell and the bearing shell.

BRIEF DESCRIPTION OF THE FIGURES

The invention is described in more detail hereinafter with reference to a drawing showing only one exemplary embodiment. In the drawing.

DETAILED DESCRIPTION

Figure 1:
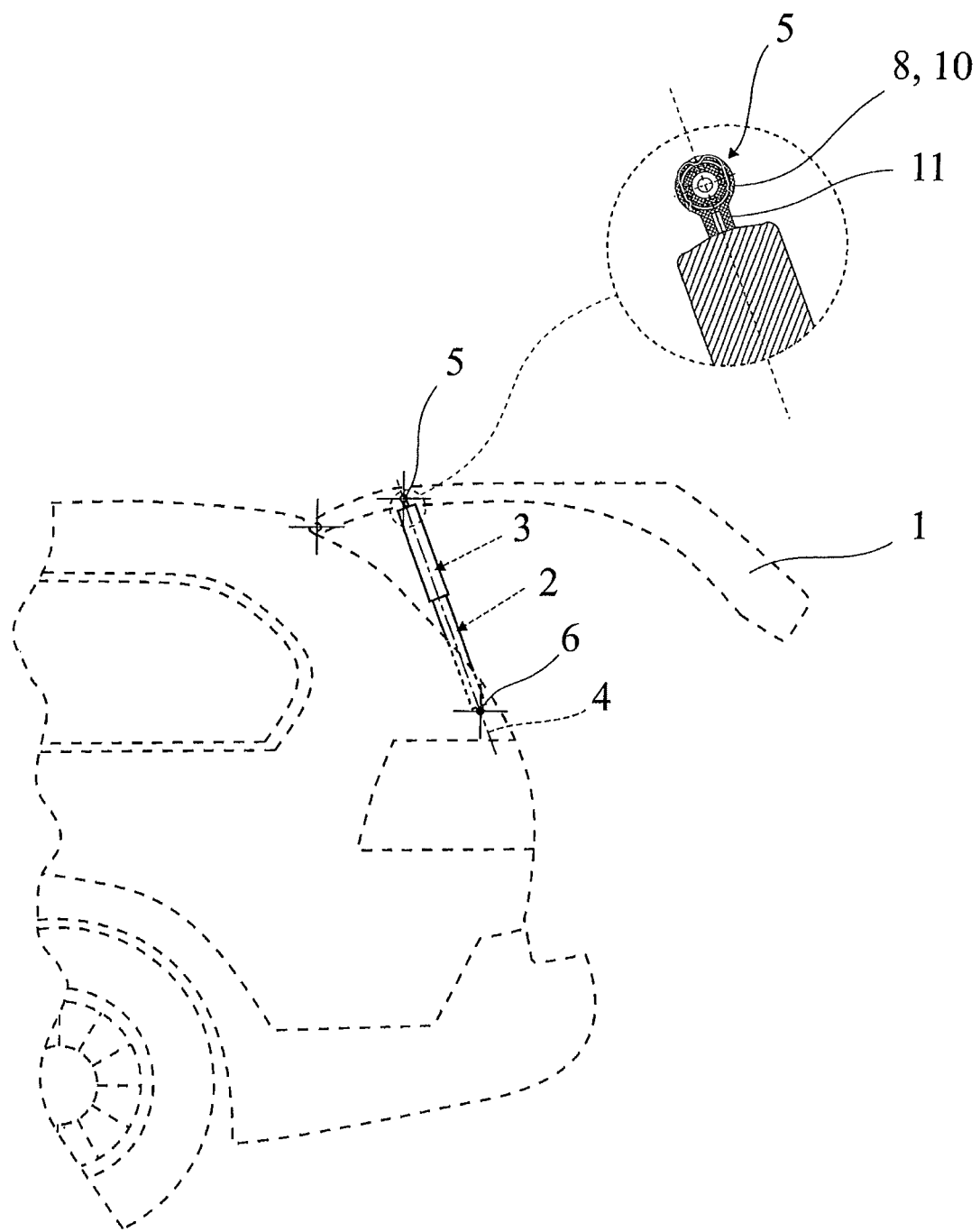
FIG. 1 shows in a schematic side view the rear of a motor vehicle with a proposed spindle drive.

The spindle drive shown in the drawing serves for the motorized adjustment of an adjusting element 1 of a motor vehicle designed as a tailgate. Other fields of application of the proposed spindle drive are conceivable as is explained in detail below.

The spindle drive is provided in the conventional manner with a drive motor 2 with a spindle-spindle nut gear 3 arranged downstream for producing a drive force along a geometric spindle axis 4.

The spindle drive has two connectors 5, 6 for transferring the drive force. In this case, at least one connector 5, 6 comprises a ball joint 7 with a ball socket 8 and an assigned ball 9. In this case, both connectors 5, 6 comprise such a ball joint 7 shown in FIGS. 2 to 5.

Figure 2:
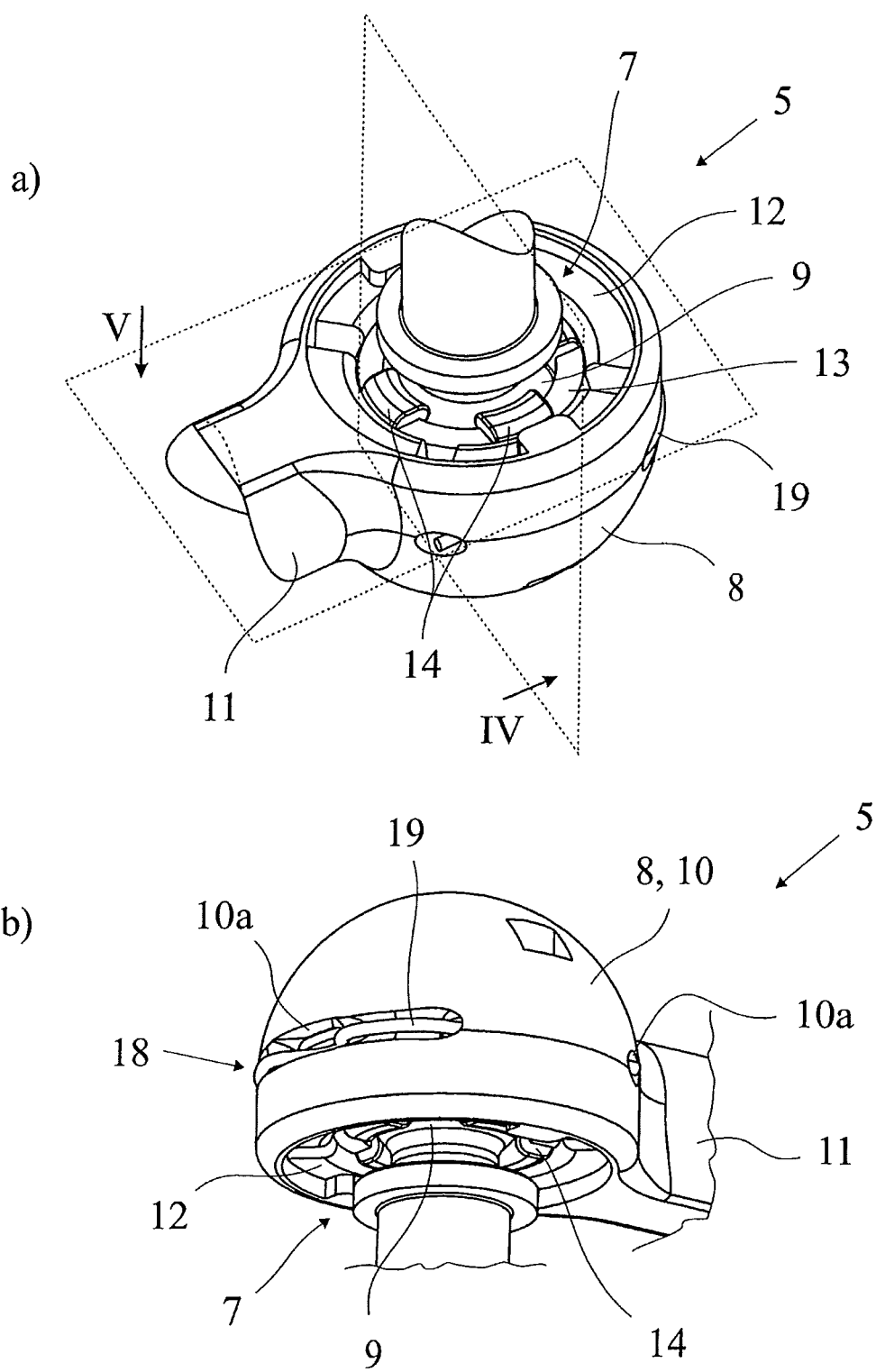
FIG. 2 shows a) in a perspective view from above and b) in a perspective view from below, in each case a connector of the spindle drive according to FIG. 1.

Viewing FIGS. 2 to 5 together shows the structural design of the ball joint 7. Specifically, FIG. 2 shows that the ball socket 8 comprises a ball socket housing 10 with a connecting piece 11. Whilst the ball socket housing 10 substantially serves for receiving the ball 9, the connecting piece 11 also provides the connection between the ball socket housing 10 and the spindle drive.

The structural design of the spindle drive may be derived most clearly from the application DE 10 2008 062 391 A1, which refers back to the applicant and the contents thereof with regard to the structural design is entirely the subject of the present application.

Figure 4:
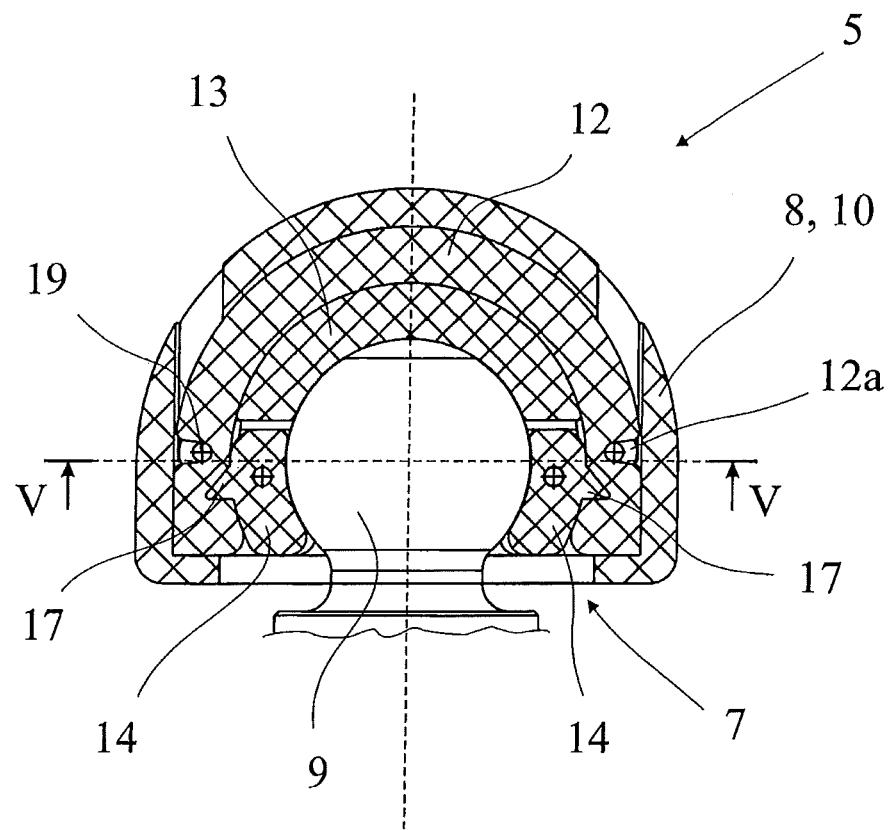
FIG. 4 shows the connector according to FIG. 2 in the sectional view IV

Essential for the proposed solution is the multi-part construction of the ball socket 8 which is revealed most clearly from the view according to FIG. 4. FIG. 4 shows that the ball socket 8 in the ball socket housing 10 has a damping shell 12 and a bearing shell 13 in the damping shell 12 for the positive engagement with the ball 9 so that the flux of force for the drive force always passes via the damping shell 12 and the bearing shell 13. It may be derived from the view according to FIG. 4 that the bearing shell 13 may be designed in a simple manner for optimal bearing and the damping shell 12 may be designed in a simple manner for optimal damping without impairing the function of the respective other component.

The term "shell" in the present case is to be understood in broad terms. It encompasses all embodiments which are suitable for surrounding the ball 9 in a bearing manner. Accordingly, shell-like shaped portions which have larger recesses or the like are also encompassed thereby.

The correct design of the ball socket 8, in particular the damping shell 12 and the bearing shell 13, is assigned particular significance in the proposed solution.

In order to ensure optimal bearing of the ball 9 in the ball socket 8, the material of the bearing shell 13 can have a greater hardness and/or a lower frictional value than the material of the damping shell 12. Accordingly, it has proved particularly advantageous if the bearing shell 13 consists of a hard elastic material, in particular plastics material. Alternatively or additionally, it may be provided that the damping shell 12 consists of a highly flexible material, in particular plastics or rubber.

A particularly advantageous arrangement with regard to the vibration behavior, on the one hand, and the sliding properties, on the other hand, has been shown when the damping shell 12 consists of an NBR rubber with a Shore hardness A of between 60 and 90, in particular of between 70 and 80. The use of a polyamide in the bearing shell 13 has proved advantageous, in particular the polyamide Ultramid® A3WG3.

In principle, however, it is also conceivable that the bearing shell 13 consists of a metal material, in particular a steel material which can be surface-treated, in particular polished, or the like.

In all proposed variants, the ball socket housing 10 can be of rigid configuration. The ball socket housing 10 can consist of a metal material, in particular steel.

The structural design of the ball socket 8 also plays an important role in the production thereof In this case, the damping shell 12 is inserted into the ball socket housing 10 and the bearing shell 13 is inserted into the damping shell 12. In principle, it is also conceivable that instead of the insertion method, an injection-molding is provided in a plastics injection-molding process. In a variant, the damping shell 12 is then injection-molded into the ball socket housing 10. Similarly, the bearing shell 13 may be injection-molded into the damping shell 12. The injection-molding in the plastics injection-molding process may, in particular, result in quite specific cost savings, in particular in mass production.

As the bearing shell 13 generally consists of a hard material, the problem occurs of mounting the ball 9 inside the bearing shell 13. In an embodiment, the bearing shell 13 is assigned at least one retaining element 14 for retaining the ball 9 in the bearing shell 13. An embodiment of the at least one retaining element 14 is revealed from viewing FIGS. 3 and 4 together. Here a plurality of, and in this case four, retaining elements 14 are provided, said retaining elements being arranged uniformly distributed over the periphery of the ball 9. As a result, a uniform retaining effect results over the periphery of the ball 9. In principle, a single, in particular annular, retaining element which circulates around the ball 9 is also conceivable.

Four retaining elements 14 are always referred to hereinafter. All relevant embodiments accordingly apply to arrangements with fewer than 4 retaining elements 14.

For the purpose of simple assembly of the ball 9, the retaining elements 14 are respectively able to be deflected out of a retaining position such that during assembly the ball 9 is able to be inserted into the bearing shell 13 by deflecting the retaining elements 14. The deflecting movement of the retaining elements 14 is indicated in FIG. 3b) by the reference numeral "15".

Figure 3:
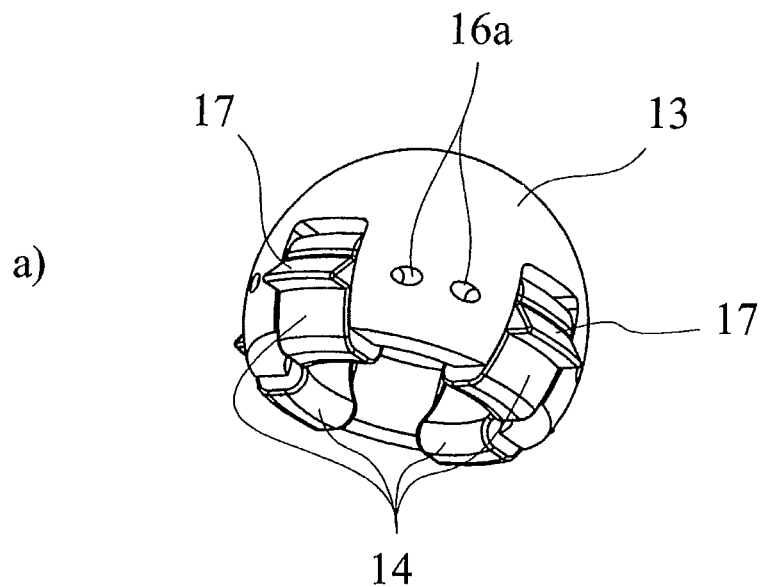
FIG. 3 shows a) the bearing shell of the connector according to FIG. 2 with retaining elements and b) the retaining elements of the connector according to FIG. 2 in each case in a perspective view.
Figure 3:
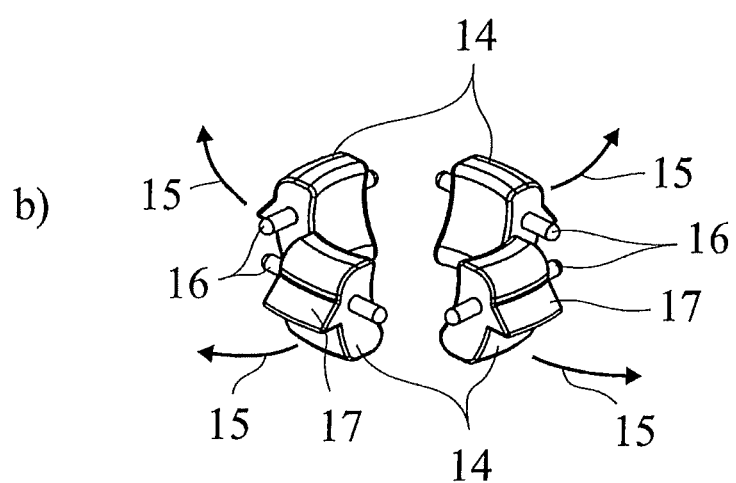

From the view according to FIG. 3 it may be derived that the retaining elements 14 are in each case of hinge-like design, wherein the retaining elements 14 in each case have a hinge pin 16 mounted in the bearing shell 13. To this end, corresponding bearing bores 16a in the bearing shell 13 are assigned in each case to the hinge pins 16. Instead of producing a hinge with a mounted hinge pin 16, in principle a film hinge can be formed integrally from the bearing shell 13 may be used.

FIG. 4 shows that the retaining elements 14 are designed and arranged in each case such that a deflection of the respective retaining element 14 is associated with an, in particular, resilient deformation of the damping shell 12. In the exemplary embodiment which is shown, the at least one retaining element 14 engages in a hook-like manner in the damping shell 12 and as a result secures the bearing shell together with the ball 9 against being pulled out. To this end, the retaining elements 14 are provided in each case with a corresponding hook 17.

In order to be able to secure the ball 9 inserted into the bearing shell 13 against being pulled out, a locking arrangement 18 can be provided for locking the retaining elements 14 in their respective retaining position. In the exemplary embodiment which is shown, the locking arrangement 18 acts primarily on the retaining elements 14 shown in FIG. 5 to the left, right and above, and not on the lower retaining element 14. In principle, however, it may also be provided that the locking arrangement 18 acts on all retaining elements 14.

For the purpose of a particularly compact design, it is provided here that by means of the locking arrangement 18 the damping shell 12 and the bearing shell 13 may be fixed in the ball socket housing 10. The following embodiments show how this is specifically achieved.

Figure 5:
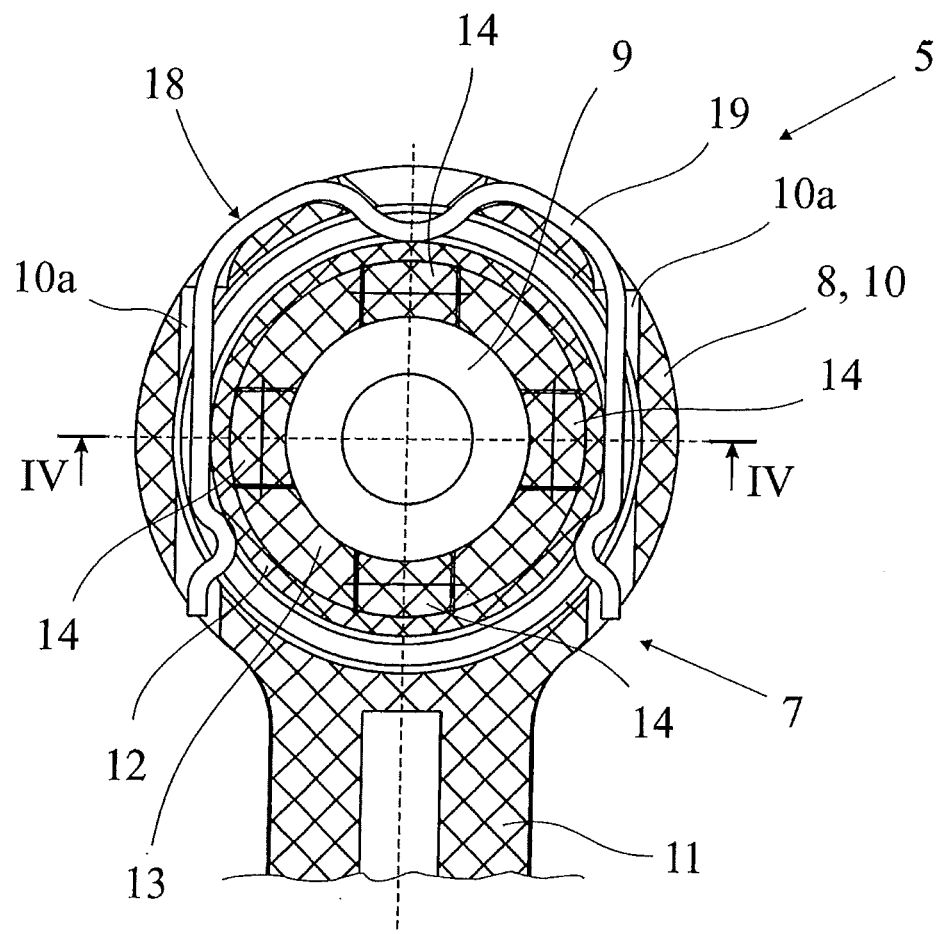
FIG. 5 shows the connector according to FIG. 2 in the sectional view V.

Viewing FIGS. 4 and 5 together shows that the locking arrangement 18 has a clamp arrangement 19 which is able to be inserted into the ball socket 8, in this case into the ball socket housing 10, which blocks a deflection of the relevant retaining elements 14 out of the respective retaining position.

The blocking of the retaining elements 14 by means of the clamp arrangement 19 may take place in principle by a direct engagement between the clamp arrangement 19 and the retaining elements 14. In this case, however, the clamp arrangement 19 is engaged with the damping shell 12 and blocks the deflection of the retaining elements 14 via the damping shell 12.

The indirect blocking of the retaining elements 14 via the damping shell 12 has the additional advantage that the damping shell 12 may be retained by means of the clamp arrangement 19 in the ball socket housing 10. To this end, the damping shell 12 in the exemplary embodiment which is shown, is provided with an, in particular, peripheral groove 12a in which the clamp arrangement 19 engages.

Viewing FIGS. 4 and 5 together shows that the ball socket housing 10 comprises a receiver, in this case openings 10a for inserting the clamp arrangement 19, whereby a counter bearing for the clamp arrangement 19 is provided.

The clamp arrangement 19 can be designed as a wire clamp which is accordingly able to be inserted into the openings 10a of the ball socket housing 10. In an embodiment, the wire clamp 19 is of substantially U-shaped design. The U-shaped wire clamp 19 may be accordingly inserted with both of its free ends into the openings 10a of the ball socket housing 10.

The proposed spindle drive is able to be used for all manner of adjusting elements 1 of a motor vehicle. For example in this case the aforementioned tailgate, a trunk lid, an engine hood, a side door, a luggage compartment flap, a lifting roof or the like, of a motor vehicle may be cited.

According to further teaching, which also has independent meaning, a ball socket 8 for an upper ball joint 7 for transferring drive force is claimed, said ball socket having a ball socket housing 10 with a connecting piece 11.

It is essential according to this further teaching that a damping shell 12 is provided in the ball socket housing 10 and a bearing shell 13 for positive engagement with the assigned ball is provided in the damping shell 12 so that the flux of force for the drive force passes via the damping shell 12 and the bearing shell 13. Reference may be made to all embodiments of the proposed spindle drive which are appropriate for describing the ball socket 8.

The invention claimed is:

1. A spindle drive for an adjusting element of a motor vehicle comprising a drive motor with a spindle-spindle nut gear arranged downstream for producing a drive force along a geometric spindle axis, wherein two connectors are provided for transferring the drive force and wherein at least one connector comprises a ball joint with a ball socket and an assigned ball, wherein the ball socket comprises a ball socket housing with a connecting piece, wherein the ball socket in the ball socket housing has a damping shell and a bearing shell in the damping shell for the positive engagement with the ball so that the flux of force for the drive force passes via the damping shell and the bearing shell, wherein the bearing shell is assigned a plurality of retaining elements for retaining the ball in the bearing shell, the plurality of retaining elements being arranged over the periphery of the ball, wherein the plurality of retaining elements are able to be deflected out of a retaining position such that the ball is able to be inserted into the bearing shell by deflecting the plurality of retaining elements, and wherein the plurality of retaining elements is designed and arranged such that a deflection of the plurality of retaining elements is associated with resilient deformation of the damping shell.

2. The spindle drive as claimed in claim 1, wherein the material of the bearing shell has a greater hardness and/or a lower frictional value than the material of the damping shell.

3. The spindle drive as claimed in claim 1, wherein the damping shell is inserted into the ball socket housing or is injection-molded in a plastics injection-molding process, and/or the bearing shell is inserted into the damping shell or injection-molded in the plastics injection-molding process.

4. The spindle drive as claimed in claim 1, wherein a locking arrangement is provided for locking the at plurality of retaining elements in its retaining position.

5. The spindle drive as claimed in claim 4, wherein the locking arrangement has a clamp arrangement which is able to be inserted into the ball socket, which blocks deflection of the plurality of elements out of its retaining position.

6. The spindle drive as claimed in claim 5, wherein the clamp arrangement is engaged with the damping shell and blocks the deflection of the plurality of retaining elements via the damping shell.

7. The spindle drive as claimed in claim 6, wherein the clamp arrangement retains the damping shell in the ball socket housing.

8. The spindle drive as claimed in claim 5, wherein the ball socket housing comprises a receiver.

9. The spindle drive as claimed in claim 5, wherein the clamp arrangement is designed as a wire clamp.

10. The spindle drive as claimed in claim 9, wherein the wire clamp is of substantially U-shaped design and with both of its free ends is able to be inserted into corresponding openings of the ball socket housing.

11. The spindle drive as claimed in claim 1, wherein the adjusting element is a tailgate, a trunk lid, an engine hood, a side door, a luggage compartment flap, or a lifting roof of a motor vehicle.

12. The spindle drive as claimed in claim 1, wherein a plurality of retaining elements are arranged uniformly over the periphery of the ball.

13. The spindle drive as claimed in claim 1, wherein at least one of the plurality of retaining elements has a hinge pin mounted in the bearing shell or is configured as a film hinge which is formed integrally from the bearing shell.

14. The spindle drive as claimed in claim 1, wherein the at least one of the plurality of retaining elements engages in a hook-like manner in the damping shell and, as result, secures the bearing shell together with the ball against being pulled out.

15. A ball socket for a ball joint for transferring drive force, wherein a ball socket housing is provided with a connecting piece, wherein a damping shell is provided in the ball socket housing and a bearing shell for the positive engagement with the assigned ball is provided in the damping shell, so that the flux of force for the drive force passes via the damping shell and the bearing shell, wherein the bearing shell is assigned a plurality of retaining elements for retaining the ball in the bearing shell, the retaining elements being arranged over the periphery of the ball, wherein the plurality of retaining elements is able to be deflected out of a retaining position such that the ball is able to be inserted into the bearing shell by deflecting the plurality of retaining elements, and wherein the plurality of retaining elements is designed and arranged such that a deflection of the plurality of retaining elements is associated with resilient deformation of the damping shell.

16. The ball socket as claimed in claim 15, wherein the material of the bearing shell has a greater hardness and/or a lower frictional value than the material of the damping shell.

* * * * *

UNITED STATES PATENT AND TRADEMARK OFFICE
CERTIFICATE OF CORRECTION

PATENT NO. : 9,291,194 B2
APPLICATION NO. : 14/368203
DATED : March 22, 2016
INVENTOR(S) : Ulrich Strobel et al.

It is certified that error appears in the above-identified patent and that said Letters Patent is hereby corrected as shown below:

Title Page

Item (72) Inventors, "Hallstadt" should read --Meeder--.

Claims

Claim 4, Column 7, Line 24, "the at plurality" should read --the plurality--.

Claim 5, Column 7, Line 29, "plurality of elements" should read --plurality of retaining elements--.

Signed and Sealed this
Seventh Day of June, 2016

Michelle K. Lee
*Director of the United States Patent and Trademark Office*